United States Patent Office 3,590,063
Patented June 29, 1971

3,590,063
ORGANIC 1,3-DISILYL-1,3,2,4-DIAZADISILET-IDINES AND PROCESS
Walter Fink, Ruschlikon, Zurich, Switzerland, assignor to Monsanto Company, St. Louis, Mo.
No Drawing. Continuation-in-part of applications Ser. No. 591,418, Nov. 9, 1965, now Patent No. 3,468,922, and Ser. No. 600,781, Dec. 12, 1966, now Patent No. 3,414,584. This application May 31, 1968, Ser. No. 733,329
Int. Cl. C07f 7/02
U.S. Cl. 260—448.2N  9 Claims

ABSTRACT OF THE DISCLOSURE

Organic 1,3 - disilyl - 1,3,2,4 - diazadisiletidines of the formula

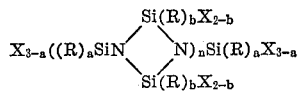

and process for making comprising reacting a compound of similar structure as above with $R_aSiX_{4-a}$ to exchange silyl groups external and/or internal of the silazane ring.

---

This application is a continuation-in-part of applicant's copending application Ser. No. 591,418, filed on Nov. 9, 1956 and now U.S. Pat. No. 3,468,922 and applicant's copending application Ser. No. 600,781, filed on Dec. 12, 1966 and now U.S. Pat. No. 3,414,584.

The present invention relates to organic 1,3-disilyl-1,3,2,4-diazadisiletidines and process for preparing. These compounds are of the general formula (A)
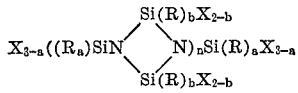

in which the groups R signify identical or different, possibly substituted and/or ethylenically or acetylenically unsaturated hydrocarbon groups, however, not exclusively methyl groups; heterocyclic groups or, but not exclusively, hydrogen atoms, fluorine atoms or silyl groups, the silyl groups possibly being linked through hydrocarbon groups; two groups R on a same silicon atom can be members of a heterocyclic group; X signifies a reactive halogen atom, i.e. chlorine, bromine or iodine atoms; $a$ stands for 0, 1, 2 or 3, $b$ for 0, 1 or 2 and $n$ represents the number of units. Each R group preferably has not more than 24 carbon atoms and for some uses, not more than 8 carbon atoms.

Under the term "silyl group" is understood any silicon-containing group which is linked through a silicon atom. Thus, there are also included silyl groups having, for example, two silicon atoms attached together either directly or through a hydrocarbon group.

The process of invention is characterized in that the exchange of at least one silyl group is effected with a compound of the general formula (B)
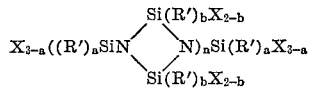

in which X, $a$, $b$ and $n$ are defined above and the R's signify hydrogen atoms and/or alkyl groups having 1–3 carbon atoms, by reaction of a halosilane of the general formula (C)   $R_aSiX_{4-a}$ in which R, X and $a$ are defined as above, whereby the group R' in the silyl group to be exchanged and the halosilane are chosen so that the halosilane splitting off possesses a lower boiling point and/or a smaller number of reactive halogen atoms attached to the silicon than the halosilane to be reacted.

The methods known up to now are either limited to the preparation of the 1,3-bis-dimethylchlorosilyl-2,2,4,4-tetramethyl-1,3,2,4-diazadisiletidine or there are necessary, as starting compounds, alkali salts difficult to prepare or end products containing halogen atoms attached to silicon atoms cannot be prepared at all.

Easily available starting compounds (B) will be used in the process of invention. The group R' preferably represents a lower alkyl group having 1–3 carbon atoms and X a chlorine atom.

The starting compound (B) having $n=1$ can be prepared especially expediently according to copending application Ser. No. 625,309, filed Mar. 23, 1967, by reaction of a cyclic silazane of the formula $(R'_2SiNH)_c$ ($c=3$ or 4), e.g. hexamethylcyclotrisilazane or octamethylcyclotetrasilazane with a halosilane of the formula $R'_2SiX_2$, e.g. dimethyldichlorosilane, using a molar ratio of $1:c$ in the presence of a hydrogen halide scavenger, or by heating a linear silazane of the formula $X(R')_2SiNHSi(R')_2X$, e.g. 1,3-dichlorotetrmethyldisilazane, in the presence of hydrogen halide scavenger, e.g. triethylamine or butyl lithium.

The same starting compounds (B) having $n>1$ can be obtained according to copending application Ser. No. 658,629, filed Aug. 7, 1967, by reacting a cyclosilazane, such as cited above, and a halosilane using a molar ratio of at most $$1: \frac{c}{1.5}$$

without the presence of a hydrogen halide-binding agent. By this process, there are obtained oligomeric to polymeric products having a higher and higher amount of units $n$, when the amount of halosilane is decreased, thereby less and less monomeric product is formed. While with, e.g., hexamethylcyclotetrasilazane and a halosilane at a proportion of 1:2 about 80% of monomeric product is formed, only about 10% are present at a proportion of 1:1.

Instead of dimethyldichlorosilane usually used to prepare hexamethylcyclotrisilazane or octamethyltetrasilazane by reacting with ammonia other organic chlorosilanes, especially those which are conveniently obtainable by a direct synthesis, can also be used for the preparation of such precursor compounds. Examples are methyldichlorosilane, methyldichlorofluorosilane, diethyldichlorosilane, ethyldichlorosilane, ethyldichlorofluorosilane, divinyldichlorosilane, 1 - dichlorosilacyclopentane, dichlorosilane and dichlorodifluorosilane. Then with ammonia the precursor compounds will be formed which contain on their silicon atoms either exclusively organic groups or an organic group and a hydrogen atom or exclusively hydrogen atoms. By reacting such precursor compounds with a halosilane, there can be obtained the starting compounds (B) usable in the present process, as has already been mentioned above. The starting compounds (B) can have silyl groups of different kinds, i.e. be unsymmetrically substituted.

In the most convenient compounds for carrying out the process, the groups R' are methyl groups and/or hydrogen atoms since these compounds are easily prepared and the trimethylchlorosilane (B.P. 57.3° C.), dimethylchlorosilane (B.P. 34.7° C.), chlorosilane (B.P. −30.4° C.), dimethylchlorosilane (B.P. 70.0° C.), dichlorosilane (B.P. 66.4° C.), methyldichlorosilane (B.P. 40.7° C.), methyltrichlorosilane (B.P. 66.4° C.), trichlorosilane, tetrachlorosilane (B.P. 57.6° C.), which are cleaved in the reaction, possess a relatively low boiling point. The silyl group exchange is an equilibrium reaction, especially when silyl groups of a similar kind are reacted and split off. The reaction proceeds better and more uniformly, the greater the difference in boiling point between the silane used and the cleaved silane and the faster the latter is removed from the reaction mixture. Thereby, an undesired comproportionation of the silanes can also be avoided.

It has also been found that a halosilane (C) showing about a same boiling point or even a lower boiling point than the halosilane formed in the reaction can be reacted, when the former, as compared with the latter, possesses a greater number of reactive halogen atoms (X).

Therefore, the preferred starting compounds (B) mentioned above can be resilylated also with, for example, $SiCl_4$.

Depending on the proportion of the reactants (B) and (C) used and to the kind of halosilane, one silyl group up to all silyl groups present and linked to one nitrogen atom or to two nitrogen atoms can be exchanged. It has been found that in the exchange of only one silyl group the replacement of a terminal silyl group proceeds about as fast as that of a silyl group forming a part of the ring so that, for example, according to Equation $a$ below both possible isomeric end products will be formed. Using a proportion of (B):(C) like 1:2, three isomers can be formed according to Equation $b$:

When the halosilane to be reacted contains only one reactive halogen atom on its silicon atom, only the terminal silyl groups can be replaced. For the replacement of ring silyl groups there are necessary at least two reactive halogen atoms.

It has been found that a considerable lowering of the melting points can be achieved if one of the four silyl groups present bears other substituents than the others. This is especially the case if one of the terminal silyl groups is involved. According to the present process, by introduction of higher organic groups than, e.g., methyl, there can be prepared end products having also a higher boiling point and consequently a wider liquid range.

In general, only the terminal silyl groups should be exchanged in the condensed starting compounds (B) having $n>1$ by reacting with a monohalosilane in order to get end products which are directly utilizable.

The process of invention is generally employed for the preparation of end products showing a wider liquid range in comparison to the starting compounds. In order to reach this goal, the silyl groups or sila groups present in the starting compounds and containing as a rule hydrogen atoms and/or methyl groups, will be replaced for such silyl groups, or sila groups respectively, which contain higher aliphatic, cycloaliphatic, araliphatic or aromatic

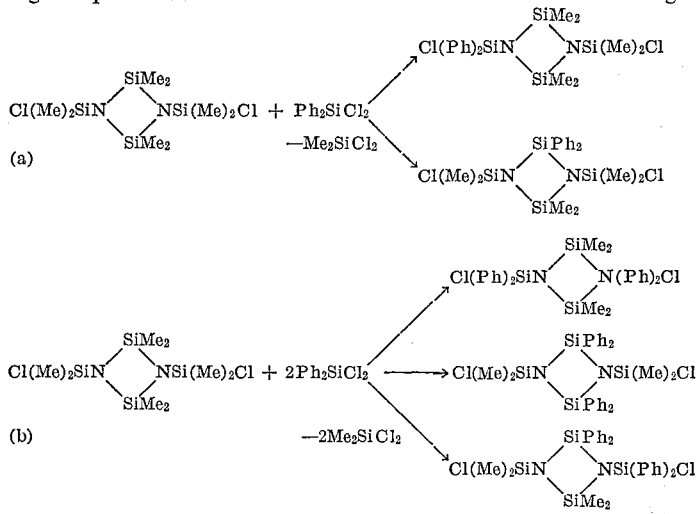

By Equation $b$ the first and the third end product will be formed in the largest amount. However, the kind of the formed isomers will also depend on species of the groups R and R'.

On reacting a 1,3-bis-(chlorosilyl)-1,3,2,4-diazadisiletidine with diphenyldichlorosilane in a ratio of 1:3 there can be formed two isomers. When the resilylation proceeds incompletely, the intermediary compound will also be found at times in the end products. When the exchange of the silyl groups is effected by, e.g., triphenylchlorosilane, the end products no longer possess halogen atoms attached to silicon atoms. On the other hand, using, e.g., phenyltrichlorosilane in a ratio of 1:1, the corresponding compounds will be formed possessing in a terminal silyl group two chlorine atoms or in a ring silyl group one chlorine atom.

Moreover, compounds can be prepared possessing other organic groups than, e.g., methyl and also other atoms than, e.g., chlorine atoms. This is illustrated as follows:

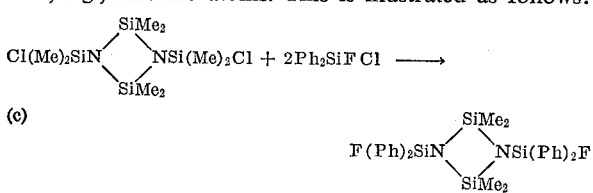

hydrocarbon groups. Using the suitable proportion, the reactants are heated until no more substantial quantity of the halosilane cleaved in the reaction and being in these cases always more volatile than the halosilane to be reacted, can be distilled from the reaction mixture.

If the preparation of chlorine-containing end products is desired showing in at least one silyl group or sila group, possibly besides a methyl group, more than one chlorine atom, a preferred starting compound in which R's signify hydrogen atoms and/or methyl groups, X a chlorine atom, $a$ is 2 or 3 and $n$ is 1, is brought to reaction with tetrachloorsilane or methyltrichlorosilane at ambient temperature or at the boiling point of these halosilanes. In general, this reaction proceeds very fast and the cleaved halosilane (trimethylchlorosilane or dimethyldichlorosilane) is expediently distilled off, possibly under reduced pressure, when the reaction is complete. This second method expediently also is used in the reaction of ethyltrichlorosilane, vinyltrichlorosilane and ethynyltrichlorosilane.

The reaction is preferably carried out without using a solvent and under exclusion of moisture. On employing the first mentioned method, the starting compound (B) can be heated at a higher temperature than the boiling point of the halosilane (C) to be reacted and the halosilane is gradually added.

The resilylation reaction of invention can be promoted by catalysts. Suitable catalysts are Lewis acids, such as titanium tetrachloride, aluminum trichloride and toluene sulfonic acid. These catalysts can also be used on a carrier such as pumice, kiesulguhr and aluminum oxide.

In general, among comparable halosilanes, e.g., tetrachlorosilane reacts easier than trichlorosilanes and these easier than the corresponding dichlorosilanes and the dichloorsilanes easier than monochlorosilanes. It is further known that aliphatic halosilanes react easier than aromatic halosilanes and among similar halosilanes, for example, bromides easier than chlorides, whereas fluorine atoms are less reactive or not at all reactive.

By the process of invention, there can be prepared 1,3-disilyl-1,3,2,4-diazadisiletidines which are useful as high temperature resistant liquids for hydraulic oils, heat transferring agents, lubricants and the like. To the extent that exchangeable halogen atoms are present, the products can be subjected to further reactions, e.g., reactive halogen atoms can be replaced with nonreactive R groups, including fluorine atoms, by methods well known to those of ordinary skill in the art.

EXAMPLE 1

199 g. (0.6 mole) of 1,3-bis-(dimethylchlorosilyl)-2,2,4,4-tetramethyl-1,3,2,4-diazadisiletidine and 152 g. (0.6 mole) of diphenyldichlorosilane are heated until 77.5 g. of dimethyldichlorosilane have been distilled off through the refluxing cooler maintained at 70° C. Duration of heating was about 3–5 hours. The end temperature reaches about 295° C. Low boiling light petroleum is added to the mixture, stirred and let stand for 2 days. After that time, there are formed 20.3 g. of crystals which are filtered off. These consist of a small amount of a compound in which all four silyl groups have been replaced, besides the corresponding compounds having two, or three replaced silyl groups. The mixture is fractionally distilled after the solvent has been removed in order to isolate the end products which can occur in two isomeric forms. There are obtained: In the boiling range up to 140° C./0.03 mm., 4 g. of starting compound; 140–160° C./0.05 mm., 241 g. (88.4%) mixture of isomers. The isomers have been formed in a ratio of exactly 1:1. On further fractionation a concentration of the individual isomers up to about 80% can be achieved. From these concentrated fractions the individual compounds can be isolated purely by careful crystallization (partly at temperatures from 0 to 10° C.). 1,3-bis-(dimethylchlorosilyl)-2,2-dimethyl-4,4-diphenyl - 1,3,2,4-diazadisiletidine; B.P. 134° C./0.005, M.P. 73–74° C.

*Analysis.*—Calc'd for $C_{18}H_{28}Cl_2N_2Si_2$ (percent): C, 47.44; H, 6.19; N, 6.15; Cl, 15.56; M.W. 455.7. Found (percent): C, 47.58; H, 6.12; N, 6.04; Cl, 15.34; M.W. 438 (in benzene).

1-dimethylchlorosilyl - 3 - diphenylchlorosilyl - 2,2,4,4-tetramethyl-1,3,2,4-diazadisiletidine; B.P. 144° C./0.005 mm., M.P. 40.5–41.5° C.

*Analysis.*—Found (percent): C, 47.04; H, 6.27; N, 6.09; Cl, 15.42; M.W. 447 (in benzene).

The determination of the structure of the isomers has been carried out by $^1H$ nuclear magnetic resonance spectrum after exchange of the chlorine atom for methyl.

EXAMPLE 2

66.2 g. (0.2 mole) and 101 g. (0.4 mole), respectively, of the reactants used in Example 1 are heated for 6–7 hours. 48.5 g. (94.2%) of dimethyldichlorosilane are distilled off and an end temperature of 355° C. is reached. The reaction product, from which small amounts of the corresponding compound having four replaced silyl groups can be separated after addition of hexane, is subjected to fractional distillation. There are obtained, besides a small amount of diphenyldichlorosilane as a forerun:

B.P. 140–150° C./0.05 mm., 10.2 g. of the compound having one silyl group exchanged (see Example 1).

B.P. 218–228° C./0.05 mm., 99.5 g. (86.5%) mixture of isomers having two silyl groups exchanged (found (percent): C, 57.50; H, 5.22; N, 5.02; Cl, 12.43). The mixture is stirred with hexane for 4–5 hours for the separation of the isomers. Thereby, a part of the substance crystallizes. The crystals (46.3 g.) are filtered off and yields, upon recrystallization in hexane or cyclohexane, pure isomers; M.P. 139° C., B.P. 218° C./0.05 mm.

*Analysis.*—Calc'd for $C_{28}H_{32}Cl_2N_2Si_4$ (percent): C, 57.58; H, 5.56; N, 4.83; Cl, 12.23; M.W. 579.9. Found (percent): C, 57.68; H, 5.32; N, 4.98; Cl, 11.91; M.W. 556 (in benzene).

According to the $^1H$ nuclear magnetic resonance spectrum, which has been obtained after having replaced the chlorine atom for methyl, the compound is 1,3-bis-(diphenylchlorosilyl) - 2,2,4,4 - tetramethyl-1,3,2,4-diazadisiletidine.

The filtrate is concentrated and upon standing for several days an additional small amount of the crystalline isomer is separated. After hexane has been removed the residue is fractionally distilled.

B.P. 218° C./0.05 mm., $n_D^{20}$ 1.5863, 51.3 g. of isomer.

*Analysis.*—Found (percent): C, 58.06; H, 5.64; N, 5.10; Cl, 12.34; M.W. 548 (in benzene).

According to the spectral analysis the compound is 1-dimethylchlorosilyl - 3 - diphenylchlorosilyl - 2,2 - dimethyl-4,4-diphenyl-1,3,2,4-diazadistiletidine.

EXAMPLE 3

66.2 g. (0.2 mole) and 152 g. (0.6 mole), respectively, of the reactants used in Example 1 are heated for 14–16 hours. 76.2 g. (98.6%) of dimethyldichlorosilane are distilled off and an end temperature of 390–400° C. is reached. Hexane is added to the cooled liquid reaction product, the mixture is vigorously stirred and let standing for 2 days. The separating crystals (7.8 g. of 1,3-bis-(diphenylchlorosilyl) - 2,2,4,4-tetraphenyl - 1,3,2,4 - diazadisiletidine, see Example 4) are filtered off. The filtrate is concentrated and fractionally distilled.

Besides a small forerun at 70–140° C./0.005 mm., there are obtained:

B.P. 223° C./0.005 mm., 9.7 g. of an isomeric mixture of the compound having two exchanged silyl groups (see Example 2).

B.P. 280–284° C./0.005 mm., 121.8 g. (86.3%) isomeric mixture of the compound having three exchanged silyl groups.

The last fraction is boiled in low boiling light petroleum for some time. The isomers having three exchanged silyl groups are separated as brittle regular crystals in the course of 2–3 days from the clear solution; M.P. 105–106° C. Yield 70–80 g. (about 64% of the last fraction) (see Example 4). After 4–5 days the precipitation of a second kind of crystals which are micro-crystalline and transparent begins. The crystals (29 g.) are filtered off after longer standing and recrystallized twice in hexane; M.P. 283° C.

*Analysis.*—Calc'd for $C_{38}H_{36}Cl_2N_2Si_4$ (percent): C, 64.83; H, 5.15; N, 3.98; Cl, 10.07; M.W. 704.0. Found (percent): C, 65.17; H, 5.11; N, 3.89; Cl, 10.3; M.W. 681 (in benzene).

According to the $^1H$ nuclear magnetic resonance spectrum, the compound is 1,3-bis-(diphenylchlorosilyl)-2,2-dimethyl14,4-diphenyl-1,3,2,4-diazadisiletidine.

EXAMPLE 4

99.5 g. (0.3 mole) and 304 g. (1.2 moles), respectively, of the reactants used in Example 1 are heated in the course of 16–18 hours up to 400° C. 146.5 g. (94.8%) of dimethyldichlorosilane are distilled off. Hexane is added after cooling, stirred for about 2 hours and the precipitated crystals are filtered off. Yield 191.0 (76.9%). The 1,3-bis-(diphenylchlorosilyl) - 2,2,4,4 - tetraphenyl-1,3,2,4-diazadisiletidine is recrystallized in octane or hexane/benzene; M.P. 259.5–260° C.

*Analysis.*—Calc'd for $C_{48}H_{40}Cl_2N_2Si_4$ (percent): C, 69.62; H, 4.89; N, 3.38; Cl, 8.56; M.W. 828.1. Found (percent): C, 69.54; H, 4.85; N, 3.55; Cl, 8.53; M.W. 798 (in benzene).

Upon concentration of the filtrate, there remains an oily, slightly yellowish colored liquid. The distillation yields, besides a small amount of diphenyldichlorosilane, 45.8 g. of a compound having a boiling point of 282° C./ 0.05 mm. This fraction crystallizes slowly upon addition of light petroleum; M.P. 105–106° C. It is a mixture of isomers of the compound having three exchanged silyl groups (see Example 3).

*Analysis.*—Calc'd for $C_{38}H_{36}Cl_2N_2Si_4$ (percent): C, 64.83; H, 5.15; N, 3.98; Cl, 10.07; M.W. 704.0. Found (percent): C, 64.64; H, 5.04; N, 3.78; Cl, 10.07; M.W. 698 (in benzene).

The second isomer (20.4 g., M.P. 283° C.) can be isolated from the filtrate of the recrystallized compound (see Example 2).

EXAMPLE 5

From the reaction of 1,3-bis-(dimethylchlorosilyl) - 2, 2,4,4-tetramethyl-1,3,2,4 - diazadisiletidine (1 mole) and phenyltrichlorosilane (2 moles) the following compounds are obtained: 1,3-bis-(phenyldichlorosilyl) - 2,2,4,4-tetramethyl - 1,3,2,4 - diazadisiletidine; B.P. 225° C./12 mm., M.P. 102° C. (from light petroleum);

1 - phenyldichlorosilyl-3-dimethylchlorosilyl-2-phenyl-2-chloro-4,4 - dimethyl-1,3,2,4 - diazadisiletidine; B.P. 132° C./0.005 mm., $n^{20}$ 1.5485;

1,3-bis-(dimethylchlorosilyl) - 2 - phenyl-2-chloro - 4,4-dimethyl - 1,3,2,4-diazadisiletidine; B.P. 170° C./12 mm., $n_D^{20}$ 1.5046;

The two latter compounds show in the NMR spectra (in $CDCl_3$ against tetramethylsilane) two signals each for the separate methyl groups, with chemical shifts of 9.4, 9.45, 9.62 and 9.70 (1:1:1:1) and 9.41, 9.44, 9.63 and 9.73 (1:1:2:2).

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

The embodiments of the invention in which an exclusive property or privilege is claimed are defined as follows:

1. A process for preparing organic 1,3-disilyl-1,3,2,4-diazadisiletidines of the general formula

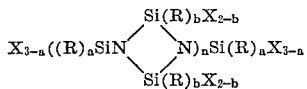

wherein R represents a hydrocarbyl group containing not more than 24 carbon atoms or hydrogen, X represents a halogen atom, $a$ represents 0, 1, 2 or 3, $b$ represents 0, 1 or 2 and $n$ represents the number of units comprising reacting a compound represented by the formula

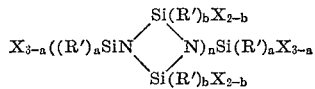

wherein X, $a$, $b$, and $n$ are above-defined and R′ represents a hydrogen or an alkyl group having from 1–3 carbon atoms with a halosilane represented by the formula

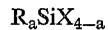

wherein R, X, and $a$ are above-defined to effect the exchange of at least one silyl group, in which the halosilane resulting from said exchange has a lower boiling point and/or a smaller number of reactive halogen atoms attached to the silicon atom than the halosilane reacted.

2. A process of claim 1 wherein the halosilane reacted contains at least one hydrocarbon group having at least 4 carbon atoms.

3. A process of claim 1 wherein the halosilane reacted contains at least one aromatic hydrocarbon group, the reaction is carried out at about the boiling temperature of said halosilane and the cleaved halosilane is continuously removed from the reaction mixture.

4. A process of claim 1 wherein the reaction is carried out in the presence of aluminum trichloride, titanium tetrachloride or toluene sulfonic acid.

5. A process of claim 1 wherein a starting compound in which the R's signify hydrogen atoms and/or methyl groups, X is a chlorine atom, $a$ is 2 or 3 and $n$ is 0, is reacted with silicon tetrachloride or methyltrichlorosilane, and the cleaved halosilane is distilled off.

6. A compound represented by the formula

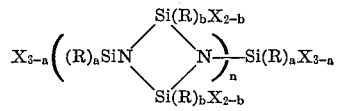

wherein R represents a hydrocarbyl group containing not more than 24 carbon atoms or hydrogen, X represents a chlorine, $a$ represents 0, 1, 2 or 3, $b$ represents 0, 1 or 2 and $n$ represents the number of units, wherein at least one R group has at least 4 carbon atoms.

7. A diazadisiletidine of claim 6 wherein R has not more than 8 carbon atoms and $n$ is 1.

8. A diazadisiletidine of claim 6 of the formula 1-phenyldichlorosilyl - 3 - dimethylchlorosilyl - 2 - phenyl-2-chloro-4,4-dimethyl-1,3,2,4-diazadisiletidine.

9. A diazadisiletidine of claim 6 of the formula 1,3-bis(dimethylchlorosilyl) - 2 - phenyl - 2 - chloro - 4,4-dimethyl-1,3,2,4-diazadisiletidine.

References Cited

UNITED STATES PATENTS 3,414,584  12/1968  Fink _____ 260—326X
3,468,922   9/1969  Fink _____ 260—448.2

TOBIAS E. LEVOW, Primary Examiner

W. F. W. BELLAMY, Assistant Examiner

U.S. Cl. X.R.
260—448.2E